US012722943B2

(12) United States Patent
Kleewein et al.

(10) Patent No.: US 12,722,943 B2
(45) Date of Patent: Sep. 1, 2026

(54) PROTECTION DEVICE DURING INSTALLATION WORKS ON A PASSENGER TRANSPORT SYSTEM

(71) Applicant: Inventio AG, Hergiswil (CH)

(72) Inventors: Gerhard Kleewein, Pressbaum (AT); Georg Wagenleitner, Roßleithen (AT)

(73) Assignee: Inventio AG, Hergiswil (CH)

( * ) Notice: Subject to any disclaimer, the term of this patent is extended or adjusted under 35 U.S.C. 154(b) by 30 days.

(21) Appl. No.: 18/701,862

(22) PCT Filed: Nov. 22, 2022

(86) PCT No.: PCT/EP2022/082879
§ 371 (c)(1),
(2) Date: Apr. 16, 2024

(87) PCT Pub. No.: WO2023/104511
PCT Pub. Date: Jun. 15, 2023

(65) Prior Publication Data

US 2024/0417222 A1 Dec. 19, 2024

(30) Foreign Application Priority Data

Dec. 10, 2021 (EP) .................................... 21213621

(51) Int. Cl.
*B66B 29/00* (2006.01)

(52) U.S. Cl.
CPC .................................... *B66B 29/00* (2013.01)

(58) Field of Classification Search
CPC ................................ B66B 29/00; B66B 31/00
See application file for complete search history.

(56) References Cited

U.S. PATENT DOCUMENTS 8,181,405 B2 * 5/2012 Nash .................. E04F 11/1851 52/800.18
11,697,518 B2 * 7/2023 Werner .................. B65B 43/08 53/456

(Continued)

FOREIGN PATENT DOCUMENTS

CN 107720513 A * 2/2018 ............ B66B 29/00
CN 107879212 A * 4/2018 ............ B66B 29/00

(Continued)

OTHER PUBLICATIONS

IPSearch History Oct. 28, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Knobbe Martens Olson & Bear LLP

(57) ABSTRACT

The disclosure relates to a protection device for protecting installation personnel while the installation personnel carry out installation works on a passenger transport system designed as an escalator or a moving walkway. The protection device has at least one blocking device, at least one support with a fastening region for fastening to a supporting structure of the passenger transport system, and a sensor system. Data relating to a fastening state of the fastening region can be detected with the sensor system and the data can be transmitted via a signal connecting unit to a data transmission module of the passenger transport system.

15 Claims, 3 Drawing Sheets

(56) References Cited

U.S. PATENT DOCUMENTS

| | | | | |
|---|---|---|---|---|
| 2018/0319631 | A1* | 11/2018 | Illedits | B65G 21/02 |
| 2023/0138486 | A1* | 5/2023 | Zanni | B25B 5/16<br>269/25 |

FOREIGN PATENT DOCUMENTS

| | | | | | |
|---|---|---|---|---|---|
| CN | 114194990 | A | * | 3/2022 | B66B 29/00 |
| EP | 3281907 | A1 | * | 2/2018 | E05D 15/0621 |
| GB | 2233696 | A | * | 1/1991 | B66B 29/00 |
| JP | 2011037526 | A | * | 2/2011 | |
| JP | 5271193 | B2 | | 8/2013 | |
| JP | 2013245098 | A | * | 12/2013 | |
| JP | 2014141343 | A | * | 8/2014 | |
| JP | 5784219 | B2 | * | 9/2015 | B66B 23/22 |
| JP | 2020-093869 | A | | 6/2020 | |
| WO | WO-2019185573 | A1 | * | 10/2019 | B66B 31/00 |
| WO | WO 2021/175708 | A1 | | 9/2021 | |
| WO | WO-2021198875 | A1 | * | 10/2021 | B25B 5/16 |
| WO | WO-2024042678 | A1 | * | 2/2024 | B66B 5/00 |

OTHER PUBLICATIONS

International Search Report issued in application No. PCT/EP2022/082879 on Feb. 1, 2023.

Ikemoto et al., "Force Sensor System for Structural Health Monitoring using Passive RFID Tags for Structural Health Monitoring", Portable-Polytronic 2008—2nd IEEE International Interdisciplinary Conference on Portable Information Devices and the 2008 7th IEEE Conference on Polymers and Adhesives in Microelectronics and Photonics, Garmisch-Partenkirchen, Germany, 2008, pp. 1-6.

* cited by examiner

PROTECTION DEVICE DURING INSTALLATION WORKS ON A PASSENGER TRANSPORT SYSTEM

TECHNICAL FIELD

The disclosure relates to a protection device for protecting installation personnel during installation works on a passenger transport system in the form of an escalator or moving walkway, to an installation unit having a corresponding protection device, and to a method having installation steps for erecting and for dismantling the protection device.

SUMMARY

Passenger transport systems, which are configured as escalators or as moving walkways, are used in buildings in the public sector, for example in train stations, subway stations, airports as well as in shopping malls, cultural centers and the like. Escalators or moving walkways have a load-bearing structure which is referred to as a supporting structure. In most cases, this supporting structure is a truss structure which is produced by the manufacturer as a complete unit or divided into supporting structure modules. The supporting structure or its supporting structure modules or truss modules are installed in a building, with the supporting structure connecting two floors of the building, for example. The movable components of the escalator or moving walkway, for example a step belt or a pallet belt, circulating handrail belts, deflection axles, a drive shaft and parts of the drive motor and transmission and the like, are arranged in this supporting structure. Furthermore, stationary components, such as balustrades, comb plates, bearing points, raceways, and guide rails, a controller, monitoring systems, safety systems and the like are also fixedly connected to the supporting structure. Normally, escalators and moving walkways are completely assembled in the manufacturing plant and, as a whole or divided into sections by virtue of the supporting structure modules, are transported from the manufacturing plant to the building and used there in the designated support points.

Completely constructed passenger transport systems of the type mentioned above or their sections have a relatively large cross section, which sometimes causes considerable problems when a new escalator or a new moving walkway is to be introduced into an existing building. In order to reduce this cross section for transport from the manufacturing plant to the support points of the building, which are to accommodate the escalator or moving walkway, the balustrades are often not assembled at the manufacturing plant: instead, they are supplied disassembled into their components. This has the additional advantage that they can be transported with significantly better protection than if they were installed in their exposed position on the supporting structure. In order to be able to connect the components of the balustrades to the supporting structure, there are balustrade clamps fixedly installed on the supporting structure, in which balustrade clamps the balustrade components, in particular balustrade panels made of glass, can be permanently clamped in place. Since the balustrades have many components visible to the users, it is particularly advantageous if the balustrades (including those with sheet metal panels) are installed on the construction site during the last installation steps.

However, due to the lack of balustrades, the workplace of the assembly personnel should be secured in a particular manner on the supporting structure. For this purpose, WO 2019/185573 A1 proposes a protection device designed as a maintenance railing, which protection device can be fastened to the upper chord of the supporting structure by means of clamp devices located on the supports. This protective device is very easy to install or remove. WO 2021/175708 A1 also discloses a corresponding maintenance railing, which can be clamped in place not on parts of the supporting structure, but rather in the balustrade clamps of the passenger transport system. During the installation of the balustrade panels, the protection device is then dismantled support by support and the gaps created are immediately provided with balustrade panels.

However, it can happen that the installation personnel do not adhere to the defined instructions and work specifications and install the passenger transport system in the building without proper erection of the protection device.

The object of the present disclosure is to create a protection device which prohibits this negligence and thus prevents accidents.

This object is achieved by a protection device for protecting installation personnel during installation works on a passenger transport system in the form of an escalator or moving walkway. The protection device can comprise at least one blocking device and at least one support, which are fixedly connected to one another or can, with suitable connection points, be connected to one another. The blocking device can extend, at least during the installation works, transversely to the support and along the longitudinal extent of the passenger transport system, wherein the support has a fastening region at one of its ends, which fastening region is designed for fastening to a supporting structure of the passenger transport system.

According to the disclosure, the protection device can have at least one sensor module and a signal connecting unit, the signal connecting unit being configured to exchange data with the at least one sensor module and with a data transmission module of the passenger transport system. The sensor module can be arranged in the fastening region of at least one support, and this sensor module can detect data about a fastening state of the fastening region and can transmit this data via the signal connecting unit to the data transmission module of the passenger transport system.

In other words, one support, a plurality of supports or all supports of the protection device can have a sensor module in the fastening region thereof. The sensor module can detect whether or not the protection device is fastened to the supporting structure, and can transmit corresponding data via the signal connecting unit to a data transmission module of the passenger transport system. The data transmission module can forward this data, for example, to a service and installation center which coordinates and monitors the installation works. Since the protection device may be erected already at the beginning of the installation works, a supervisor in the service and installation center can retrieve the current data about the fastening state of the protection device and can intervene if the protection device has not been erected. As described in more detail below, installation instructions to the installation personnel can also be withheld until the protection device has been properly erected. It is also conceivable that installation tools or parts of the controller of the passenger transport system can be automatically locked or unlocked depending on the data reflecting the fastening state.

There is a plurality of sensor modules which can be used in the protection device according to the disclosure. Common to all of them is that the sensor module can comprise at least one sensor element from the group comprising force measurement sensor, bipolar switch, proximity sensor, optical sensor and the like, and the sensor element can be arranged in the fastening region of the support in such a way that the sensor element can optimally detect a fastening or a lack of fastening of the fastening region. If the sensor element is a force measurement sensor, for example, a strain gage, it can be arranged in the fastening region in such a way that it detects, using a change in electrical resistance, an extension or compression of the fastening region as a result of force application caused by fastening means. If necessary, the fastening region can be optimized for the sensor element used.

In addition, the sensor element can be supplied with electrical energy so that a physical state change in the fastening region can be detected at all. For this purpose, the sensor module can comprise, for example, a battery, a capacitor and the like, which can be charged with electrical energy and can output this electrical energy again. However, it is also possible, for example, to supply electrical energy to the sensor module inductively during the detection of the fastening state.

Furthermore, a data transmission means is required, which can convert the usually analog signal of the sensor element into electronically processable data and can forward said data to the signal connecting unit. Active or passive systems, such as Bluetooth, HF transmitting units, a passive or active RFID tag (RFID chip with a loop antenna) and the like, can be used as data transmission means. Although, for practical reasons, wireless, passive data transmission means are preferable. Wired systems can, of course, also be provided—the data transmission means can be a simple plug connection or a network node.

The use of passive RFID tags, the chip of which is coupled, for example, to a strain gage as a sensor element, is particularly advantageous. The changing resistance value of the strain gage as a result of force acting on the support provided with the sensor module changes the output response or the output data of the RFID tag. Such a sensor module also does not require its own power source, since the required electrical energy is inductively fed in via the antenna during readout. Such a sensor module is described, for example, in the report "Force Sensor System for Structural Health Monitoring using Passive RFID Tags for Structural Health Monitoring" by the authors Yusuke Ikemoto, Shingo Suzuki, Hiroyuki Okamoto, Hiroki Murakami, Xin Lin, Hideo Itoh, and Hajime Asama [https://iecexplore.ieee-.org/document/4681264] from the year 2008.

Accordingly, the signal connecting unit of the protection device can be an RFID reader which also has a signal transmission module. The signal transmission module can be used to transmit the data read out from the sensor module, optionally processed, to the data transmission module of the passenger transport system, which data transmission module is described in more detail herein.

In one embodiment of the disclosure, the fastening region of the support can be in the form of a clamping region. The clamping region can be modeled on a panel clamping region of a balustrade panel of the passenger transport system and is provided for being fastened in a clamping device fixedly installed on the supporting structure of the passenger transport system. In other words, in the case of this embodiment of the support, clamping devices can be used which are already present on the supporting structure. When the balustrade panels are being installed, this can carried out step by step by immediately equipping, after the removal of a support, the freed-up clamping device with a balustrade panel. With the sensor module, it can be detected whether or not the clamping region is fastened in a clamping device. Here, the term "modeled" means that the fastening region, like the panel clamping region, is designed in such a way that it can fit into a released clamping device and also is securely clamped in place by the clamping device after the clamping device has been tightened.

In another embodiment of the disclosure, the fastening region of the support can be in the form of a clamp device. This clamp device may be suitable for fastening to the supporting structure of a passenger transport system and may be matched to corresponding components of the supporting structure, for example, to the cross section of the upper-chord steel profile of the supporting structure. The clamp device can have a clamping plate and at least one clamping claw that can be braced toward the clamping plate. The sensor module can be arranged in the clamping claw and/or in the clamping plate, so that, with the sensor module, it can be detected whether or not a region of the supporting structure is fastened between the clamping plate and the clamping claw.

In another embodiment of the disclosure, at least two supports may be fixedly connected to at least one blocking device and thereby form a rigid railing. As a result, they can be installed on and removed from the passenger transport system more easily than if the supports and the blocking device are separate components of the protection device.

However, such railings require more transport space for the transport between the manufacturing plant of the passenger transport system and the building in which the passenger transport system is to be installed. Also, the return transport of the railings (if provided) for further uses is more complex. For these reasons, in another embodiment of the disclosure it is proposed that the at least one support may have a receptacle in which the blocking device can be arranged so as to protrude.

This embodiment can have the disadvantage that the installers install the supports but not the blocking devices. In order to prohibit this, a sensor module may be arranged in the receptacle, which sensor module can detect data about an arrangement of the blocking device or its absence in the receptacle. These data, too, can be transmitted via the signal connecting unit to the data transmission module of the passenger transport system.

In another embodiment of the disclosure, the one or more supports can have a hinge arranged between the fastening region and the blocking device or the receptacle thereof. As a result, the support can be pivoted between a transport position and an installation position. In addition, a sensor module can be arranged in the region of the hinge, which sensor module detects data about a position state of the hinge and transmits these data via the signal connecting unit to the data transmission module of the passenger transport system.

The support provided with a hinge can be pivoted between a transport position and an installation position. As a result of this embodiment, it is possible that the protection device can be fastened to the supporting structure already in the manufacturing plant. Subsequently, the supports fastened to the supporting structure and also any blocking device connected to the supports can be pivoted into the transport position. In this case, the transport position is that position in which the support extends substantially horizontally and in the transverse direction relative to the longitudinal extension of the passenger transport system.

In other words, the transport position may allow the height of the passenger transport system to be kept as low as possible for the transport thereof between the manufacturing plant and the designated support points in the building, despite the protective device already being installed. As soon as the passenger transport system has been inserted into the designated support points of the building, the protective device or the supports thereof can be pivoted into the assembly position. Here, the assembly position can be understood as a vertical towering of the supports. Or to put it more simply, the protective device can leave the manufacturing plant in a lying position relative to the passenger transport position and can be unfolded and fixed in a standing position on the construction site.

In order to prevent the support from unintentionally folding back from the assembly position back into the transport position, in a further embodiment, the support can have a blocking device. Said blocking device can be configured to block a pivoting of the hinge at least in the assembly position. The position of the blocking device can also be detected using a sensor module.

In another embodiment of the disclosure, the blocking device may be designed such that personal protective equipment can be fastened thereto. The personal protective equipment can comprise a harness, which usually has two short lengths of rope (tethers) with snap hooks. The installer can wear the harness on their body, over the clothing, and at least one of the snap hooks can be attached to the blocking device or to the support. It is usually prescribed that both snap hooks be attached. If the installer falls, their fall height is limited by the rope length of the tethers. The extensibility of the tethers is also specified in the relevant standards, so that the fall is arrested in a damped manner. Furthermore, at least one sensor module can be arranged in the support in such a way that a stress spike acting on the protection device, as a result of a fall, can be detected by the sensor module and corresponding data can be transmitted via the signal connecting unit to the data transmission module of the passenger transport system. The aforementioned sensor module does not necessarily have to be independent of the sensor module that monitors the fastening region. The sensor module of the fastening region can also be arranged such that it can detect such stress spikes.

A passenger transport system and at least one protection device together can form an installation assembly, which can also comprise a user interaction module and an installation script. With this installation assembly, the following installation method can be carried out, wherein the installation personnel are forced, by the structured guidance of the installation script to be processed, to comply with the prescribed safety measures.

The method for carrying out installation works on an installation assembly can comprise the steps:

- placing the user interaction module, the signal connecting unit and the data transmission module into operation and establishing a data connection between the data transmission module and the user interaction module;
- retrieving the installation script from a storage medium via the data connection, the installation script containing the installation steps to be carried out on the passenger transport system;
- processing the individual installation steps in chronological order, wherein, after the installation step in question has been carried out, its conclusion is acknowledged with a user input in order to call up the subsequent installation step;
- carrying out the installation of the protection device on the supporting structure of the passenger transport system as a first installation step according to the defined sequence of the installation script; and
- retrieving, when the first installation step is acknowledged, data about the fastening state of the fastening region of at least one support of the protection device via the data transmission module and the signal connecting unit, the acknowledgment being permitted if the fastening region is fastened and the acknowledgment being rejected if the fastening region is not fastened.

The method described above can be supplemented by further steps. If the monitoring device is configured to detect stress spikes, the assembly script can require that the installation personnel secure themselves to the supports and/or to the blocking device with the personal protective equipment. During the execution of the installation steps, data about a stress spike, said data having been detected by a sensor module, can be transmitted via the signal connecting unit to the data transmission module of the passenger transport system and permanently stored in a storage medium. As a result, it can be checked whether the installer was exposed to excessive forces during the fall and whether the securing concept (for example the length of the tethers of the personal protective equipment or the number and/or the position of the available fastening points) has to be modified.

To ensure that the components of the protection device are removed from the passenger transport system only when the balustrade panels are being installed, the installation script can comprise the following additional steps:

- accompanying, according to the defined sequence of the installation script, the removal of the protection device from the supporting structure of the passenger transport system by the installation of balustrade panels of the passenger transport system; and
- retrieving, when this installation step is acknowledged, data about the fastening state of the fastening region of at least one support of the protection device via the data transmission module and the signal connecting unit, the acknowledgment being permitted if the fastening region is not fastened and the acknowledgment being rejected if the fastening region is fastened.

In other words, the at least one protection device can be successively replaced by balustrade panels of the passenger transport system. This is done in that, after at least one of the clamping devices of the passenger transport system has been released, the support of the protection device can be removed and, for example, a balustrade panel can be clamped in place in the clamping device instead of the support. The assembly personnel should secure themselves at the adjacent protective device (before or after) using their personal safety equipment in order to avoid a possible fall. This ensures a complete safety chain.

The disclosure herein also indicates that, analogously to the arrangement of balustrade panels, a plurality of railings lined up in the longitudinal direction also can form the protection device and not simply a single, rigid railing per side which extends over the entire length of the passenger transport system. Shorter protective devices that have to be lined up are also much easier to handle and thus further reduce the risk of accidents.

BRIEF DESCRIPTION OF THE DRAWINGS

Embodiments of the disclosure will be described below with reference to the accompanying drawings, wherein neither the drawings nor the description are intended to be interpreted as limiting the disclosure. Furthermore, the same reference signs are used for elements that are identical or have the same effect. In the drawings.

DETAILED DESCRIPTION

Figure 1:
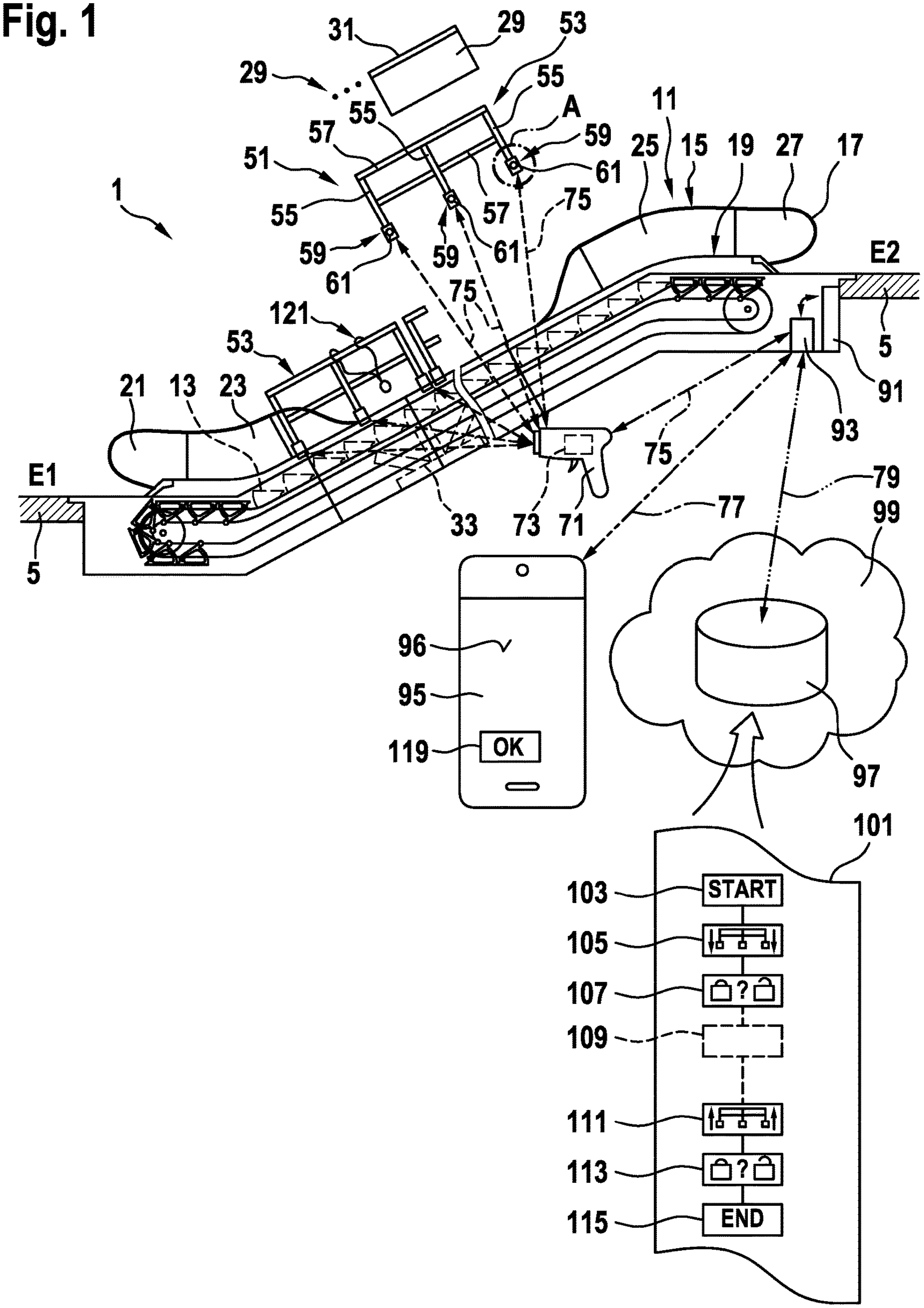
FIG. 1: shows a simplified view of an installation assembly having a protection device in a first embodiment and having a passenger transport system, in the central part of which no balustrade has yet been constructed.

FIG. 1 shows a simplified view of an embodiment of an installation assembly 1, which has a passenger transport system 11 and a protection device 51. The passenger transport system 11 connects a lower level E1 to an upper level E2 of a building 5. The passenger transport system 11, which is designed as an escalator, comprises a supporting structure 33 designed as a truss structure. A circulating step belt 13 is arranged in the supporting structure 33, which step belt is deflected at the upper level E2 and at the lower level E1 and thus has a forward portion and a return portion. For the sake of clarity, the return portion has not been shown, nor have ribs, guide rails, rail blocks and a drive unit.

The passenger transport system 11 also has two balustrades 15 that extend along each longitudinal side of the step belt 13: in FIG. 1, only the balustrade 15 arranged in the foreground in the viewing plane is visible. A handrail 17 is arranged around each balustrade 15, the return portion of which handrail is arranged in a balustrade base 19. The balustrade base 19 also connects the balustrade 15 to the supporting structure 33. The balustrade 15 comprises a plurality of (optionally transparent) balustrade panels 21, 23, 25, 27, 29; the uppermost balustrade panels 25, 27 and the lowermost balustrade panels 21, 23 have special shapes. The center balustrade panels 29 are substantially rectangular plates. On at least one edge region of each of the balustrade panels 21, 23, 25, 27, 29, a guide profile 31 for guiding the handrail 17 is arranged.

As can be seen from FIG. 1, the passenger transport system 11 is not yet fully installed. In particular, the center balustrade panels 29 can still be installed. For this reason, the handrail 17 sags down to the balustrade base 19 in the central region of the passenger transport system 11. If installation personnel are located in this central region and working there, the installation personnel should be secured against falling over the side.

To secure the installation personnel, the protection device 51 already mentioned can be temporarily installed in place of the missing balustrade panels 29. For this purpose, the protection device 51 can comprise a plurality of railings 53, which each have three supports 55 and two blocking devices 57, wherein the blocking devices 57, which are arranged parallel to one another, connect the supports 55 to one another. Specifically, the supports 55 and blocking devices 57 can be profile tubes which are fixedly welded to one another. As shown, the blocking devices 57 extend, at least when installed on the personal transport system 11 and thus during the installation work, transversely to the supports 55 and along the longitudinal extent of the passenger transport system 11. In order that the supports 55 can be fastened to the supporting structure 33 of the passenger transport system 11, the supports have a fastening region 59 at one of their ends. Because profile tubes are used, the blocking device 57 is also suitable for the fastening of personal protective equipment 121 to the blocking device, for example, with the snap hooks of the personal protective equipment 121.

To ensure that the protection device 51 is also actually used, it can have at least one sensor module 61 and a signal connecting unit 71, the signal connecting unit 71 being configured to exchange data with the at least one sensor module 61 (double arrow 75 shown with a broken line) and with a data transmission module 93 (double arrow 75 shown with a dash-dotted line) of the passenger transport system 11.

A sensor module which merely indicates the presence of the protection device 51 in the building 5 would not be expedient enough. Therefore, the sensor module 61 is arranged in the fastening region 59 of the support 55, wherein the sensor module 61 can detect data about a fastening state of the fastening region 59 and can transmit these data via the signal connecting unit 71 to the data transmission module 93 of the passenger transport system 11.

In other words, the sensor system can be used to check whether the protection device 51 is installed on the supporting structure 33 or not. Possible method steps as to how the sensor system can contribute to implementing the prescribed safety concept are to be presented herein. For this purpose, the installation assembly 1 can also comprises a user interaction module 95 and an installation script 101. The user interaction module 95 can be, for example, a laptop, a tablet or a smartphone. The installation script 101 can be retrieved from a storage medium 97 via a first data connection 77 (dash-double-dotted double arrow) between the user interaction module 95 and the data transmission module 93 of the passenger transport system 11 and via a second data connection 79 (dash-triple-dotted double arrow) between the storage medium 97 and the data transmission module 93. The storage medium 97 can be contained, for example, in the controller 91 of the passenger transport system 11 or in the data transmission module 93. As shown, however, the storage medium 97 can also be implemented in a data cloud 99 which is formed from a plurality of servers networked with one another. The installation script 101 displayed on a screen 96 of the user interaction module 95 can present in chronological order the individual installation steps 103, . . . , 115 which are still to be carried out in order to complete the passenger transport system 11 such that it is ready for operation. After each installation step 103, 115 has been carried out, its conclusion can be acknowledged with a user input 119 in order to be able to call up the subsequent installation step 103, . . . , 115.

In the present embodiment, after the start sequence 103, the installation script 101 may require the installation of the supports 55 and blocking devices 57 as a first step 105. As a next installation step 107, the fastening states of all fastening regions 59 provided with a sensor module 61 can be retrieved. Since the sensor module 61 is based on RFID technology, the fastening states may be read out with the signal connecting unit 71, which is in the form of an RFID reader, and this data may be forwarded, with an integrated signal transmission module 73, to the data transmission module 93 (dash-dotted double arrow 75). The data may be transmitted from the data transmission module 93 to the user interaction module 95 (dash-double-dotted double arrow 77) and checked there. If all fastening regions 59 are fastened or the sensor modules 61 have transmitted corresponding data may the next installation step 109, . . . , 115 of the installation script 10 be released for processing and thus the instructions belonging to this installation step 109, . . . , 115 may be displayed on the screen 96. If one of the fastening regions 59 is not fastened, said fastening region may be indicated so that it can be properly fastened.

The installation step 109 shown by a broken line represents a plurality of installation steps 109 in chronological order which may be processed in order to arrive at a passenger transport system 11 ready for operation. Here, too, after the installation step 109 in question has been carried out, its conclusion is acknowledged with a user input 119 in order to call up the subsequent installation step 109.

The installation script 101 can also require that the installation personnel secure themselves to the supports 55 and/or to the blocking device 57 with the personal protective equipment 121. As a result of a suitable arrangement of the sensor modules 61 or the arrangement of additional sensor modules 61 in the supports 55, stress spikes caused by excessive force acting on the blocking device 57 or on the supports 55 can be detected. During the carrying out of the installation steps 103, . . . , 115, data about a stress spike, which data was detected by a sensor module 61, can be transmitted via the signal connecting unit 71 to the data transmission module 93 of the passenger transport system 11 and permanently stored in a storage medium 97. As a result, it can be checked whether the installer was exposed to excessive forces during a fall and whether the securing concept (for example the length of the securing rope or the available fastening points) has to be modified.

As shown in FIG. 1, the installation script 101 also provides for the removal of the protection device 51. Here, when this installation step 111 is acknowledged, data about the fastening state of the fastening regions 59 may be retrieved via the data transmission module 93 and the signal connecting unit 71 (installation step 113). The acknowledgment with a user input 119 may be permitted if the fastening region 59 is not fastened and may be rejected if the fastening region 59 is fastened. It can thereby be ensured that no part, for example no support 55 or clamp device (see FIG. 3) of a support 55, remains on the supporting structure 33.

Figure 2:
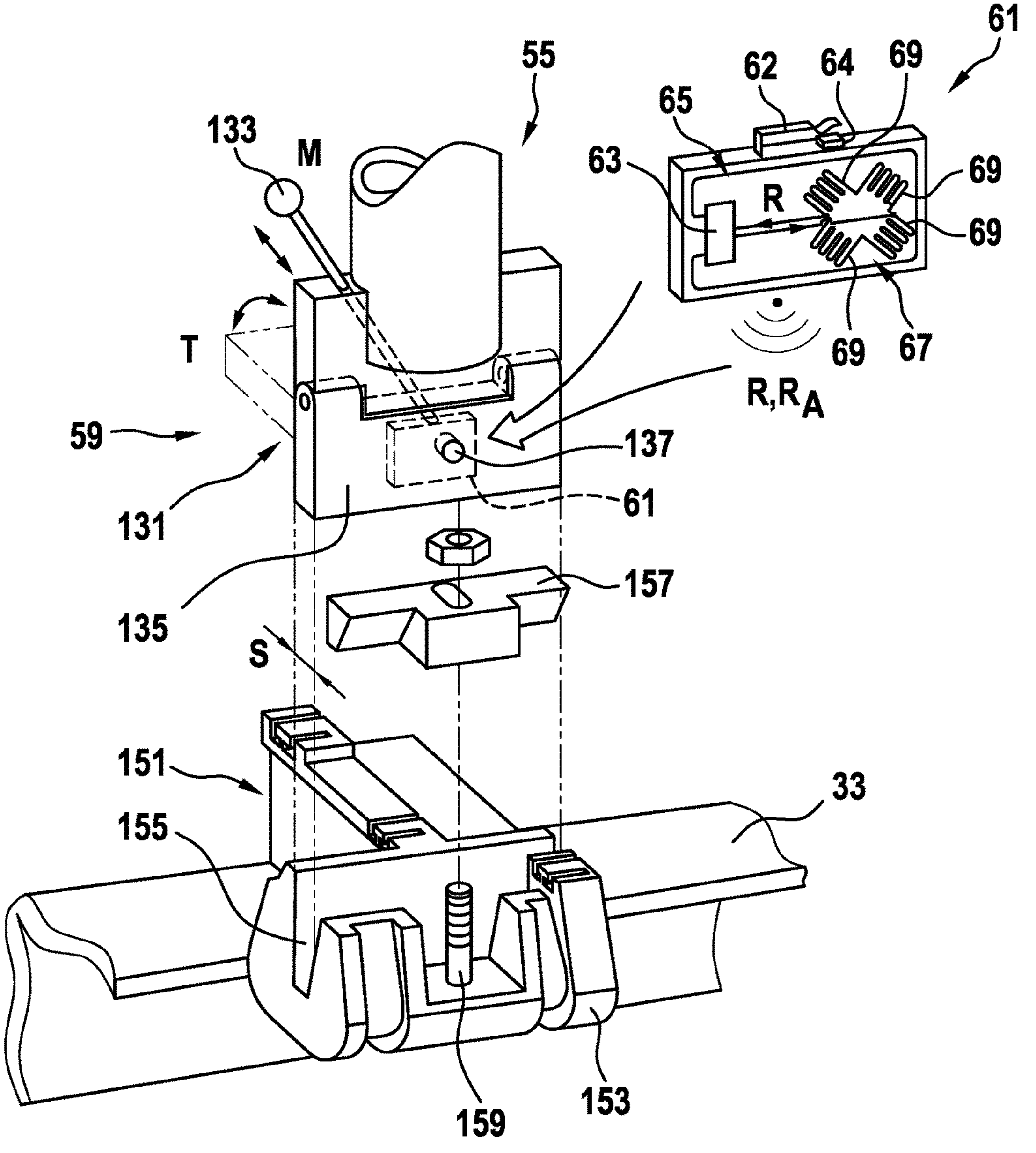
FIG. 2: shows a three-dimensional, enlarged view of detail A indicated in FIG. 1, the illustrated fastening region comprising a hinge and an engagement mechanism.

FIG. 2 shows a three-dimensional, enlarged view of detail A indicated in FIG. 1: the fastening region 59 shown here has a hinge 131 and a blocking device 133, which can be designed to block pivoting of the hinge 131 at least in an installation position M. Supports 55 having hinges 131 are preferably used when the protection device 51 is to be fastened in clamping devices 151 of the passenger transport system 11 already in the manufacturing plant. The supports 55 (with or without blocking devices 57) can then be folded down into a transport position T and transported in this transport position from the manufacturing plant to the building 5. After the passenger transport system 11 is inserted in the building 5, the supports 55 can be folded up from the transport position T into the installation position M and, if necessary, provided with the blocking devices 57.

In order that the fastening region 59 of the support 55 can be fastened in the clamping device 151 fixedly installed on the supporting structure 33 of the passenger transport system 11, said fastening region has a clamping region 135 which is modeled on a panel clamping region (not shown) of a balustrade panel 21, 23, 25, 27, 29 of the passenger transport system 11.

In order to be able to clamp the clamping region 135 in place, the clamping device 151 has a clamping jaw 153 with a wedge groove 155, as well as a wedge element 157 and a tightening element 159. The clamping region 135 is inserted into the wedge groove 155 and then the wedge element 157 is braced together with the clamping region 135 in the wedge groove 155 with the tightening element 159. The clamping region 135 has two clamping surfaces, which are parallel to one another and has thickness S of which is matched to the wedge groove 155 and to the wedge element 157, so that clamping can also be carried out really reliably. Preferably, the thickness distance S corresponds to the material thickness of the balustrade panel 21, 23, 25, 27, 29 to be clamped in place afterwards. If necessary, the clamping region 135 can be supplemented with additional insert plates (not shown) if the thickness distance S is too small.

Furthermore, a sensor module 61 (shown with additional enlargement) is arranged in the clamping region 135, with which sensor module it can be detected whether the clamping region 135 is fastened in a clamping device 151 or not. The sensor module 61 has an RFID chip 63 with a loop antenna 65 (RFID tag) and four strain gages 69, which are arranged in a bridge circuit 67 and are connected to one another in the manner shown.

If the loop antenna 65, which is in the form of an induction coil, receives electrical energy from the signal connecting unit 71 shown in FIG. 1, the RFID chip 63 may measure the resistance value of the bridge circuit 67. The RFID chip may send the measured resistance value R together with a resistance value RA stored in the RFID chip 63 as a data packet back to the signal processing unit 71 via the loop antenna 65. The resistance value RA stored in the RFID chip 63 represents the electrical resistance of the bridge circuit 67 in the unloaded state. A slightly projecting pin 137, which is arranged in the clamping region 135, transmits the clamping force of the tightened clamping device 151 to the zone of the sensor module 61 that is provided with the bridge circuit 67.

As already mentioned, the support 55 of the embodiment shown in FIG. 2 has a blocking device 133 in order to block the hinge 131 in the installation position M. The blocking device 133 is shown schematically in order to show its function. Since the sensor module 61 is arranged in the vicinity of the blocking device 133, the blocking device 133 and the position of the hinge 131 are also monitored with said sensor module. The blocking device 133 can be actuated and can act on a switch tongue 62 of the sensor module 61 if the support 55 is in the installation position M. The switching position of the switch tongue 62 can be detected by the RFID chip 63, since the switch tongue 62 is pressed onto a contact pin 64 by the blocking device 133 and, for example, a current pulse is used to check whether this circuit is closed. The sensor module 61 transmits corresponding data about the position state of the hinge 131 to the data transmission module 93 of the passenger transport system 11 via the signal connecting unit 71.

Figure 3:
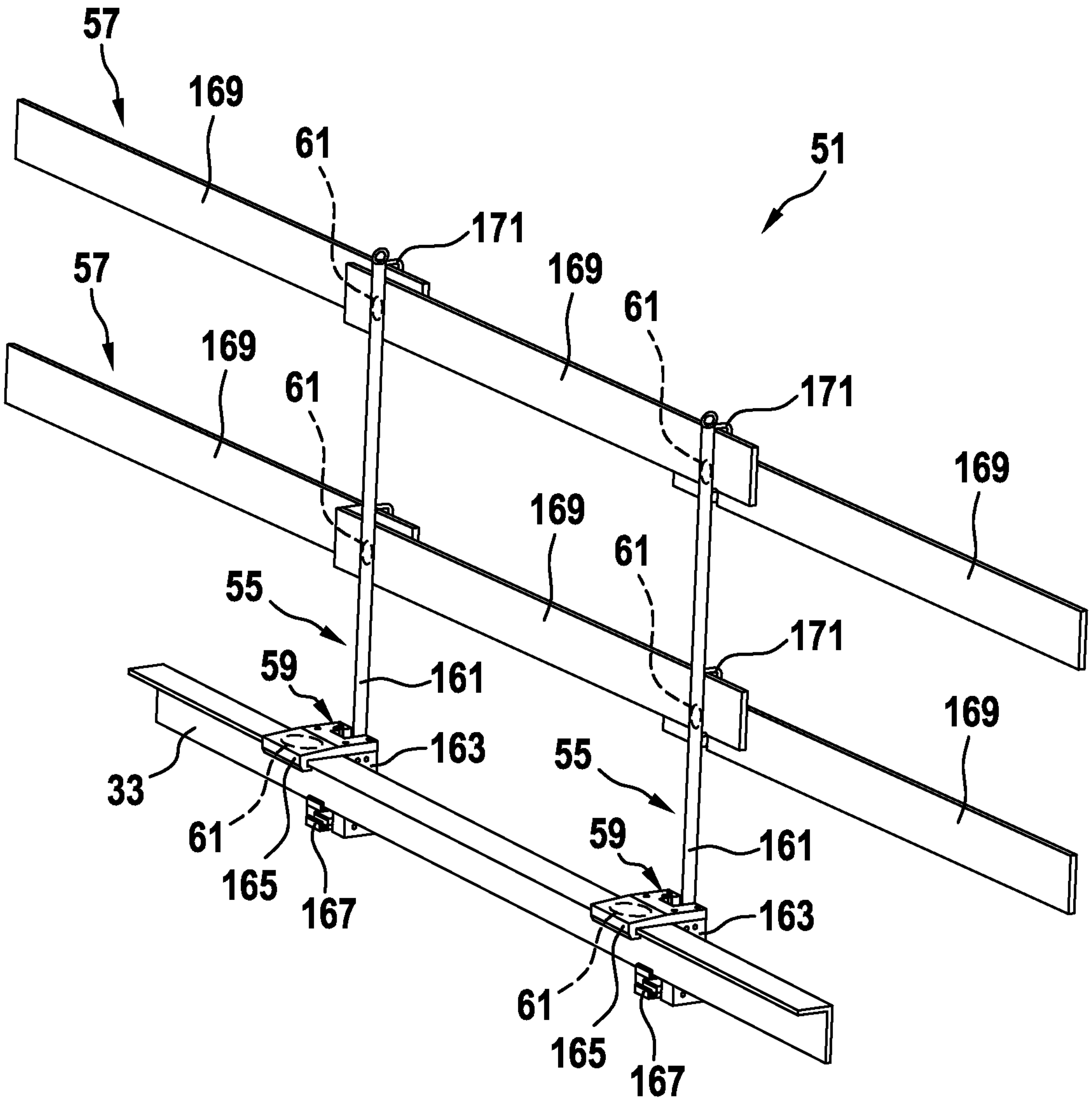
FIG. 3: shows, in a three-dimensional view, a second possible embodiment of the protection device.

FIG. 3 shows a three-dimensional view of a second possible embodiment of the protection device 51. Its supports 55 are fastened to the supporting structure 33 of a passenger transport system 11 with a fastening region 59. Unlike in the first embodiment, the supports 55 are not each a complete component, but rather have a support tube 161 and a clamp device 163 which serves as a fastening region 59 of the support. The support tube 161 can be inserted into the clamp device 163. The clamp device 163 has a clamping plate 165 and at least one clamping claw 167 which can be braced toward the clamping plate 165. In the present embodiment, the sensor module 61 is arranged in the clamping plate 165. Of course, the sensor module could also be arranged in the clamping claw 167. With the sensor module 61, it can be detected whether or not a region of the supporting structure 33 is fastened between the clamping plate 165 and the clamping claw 167.

The blocking device 57 of the protection device 51 is formed by slats 169, which are inserted through receptacles 171 of the supports 55. The supports 55 are oriented substantially perpendicular to the longitudinal extent of the supporting structure 33. The slats 169 are held substantially parallel to the longitudinal extent of the supporting structure 33 by the receptacles 171 of the supports 55. Here, each support 55 has two receptacles 171 arranged one above the other and each pair of supports 55 is connected at different heights above the supporting structure 33 by two slats 169.

In order to ensure correct arrangement of the blocking device 57 on the supports 55, sensor modules 61 are likewise arranged in the receptacles 171. The sensor modules 61 can detect data about an arrangement of the blocking device 57 in the receptacle 171 and may transmit this data via the signal connecting unit 71 to the data transmission module 93 of the passenger transport system 11.

Although FIGS. 1 to 3 show different aspects of the present disclosure on the basis of a passenger transport system 11 which is in the form of an escalator and which is intended to interconnect floors E1, E2 vertically spaced apart from one another, the described protection devices 51 can also be used similarly in the case of obliquely arranged moving walkways or in the case of moving walkways arranged on a horizontal plane.

Finally, it should be noted that terms such as "having", "comprising", etc, do not preclude other elements or steps, and terms such as "a" or "one" do not preclude a plurality. Furthermore, it should be noted that features or steps which have been described with reference to one of the above embodiments may also be used in combination with other features or steps of other embodiments described above. Reference signs in the claims should not be considered to be limiting.

The invention claimed is:

1. A protection device for protecting installation personnel during installation works on a passenger transport system in the form of an escalator or moving walkway, the protection device comprising:

at least one blocking device; and at least one support which is connected to the at least one blocking device, wherein said at least one blocking device extends transversely to the at least one support and along a longitudinal extent of the passenger transport system at least during the installation works, wherein the at least one support comprises a fastening region at one end of the at least one support, which fastening region is configured for fastening to a supporting structure of the passenger transport system;

at least one sensor module; and a signal connecting unit configured to exchange data with the at least one sensor module and with a data transmission module of the passenger transport system, wherein the at least one sensor module is positioned in the fastening region of the at least one support, the at least one sensor module configured to detect the data about a fastening state of the fastening region and to transmit said data via the signal connecting unit to the data transmission module of the passenger transport system, wherein the at least one blocking device is configured such that personal protective equipment can be fastened thereto and at least one of the at least one sensor module is positioned in the at least one support such that the at least one sensor module is configured to detect a stress spike acting on the protection device and to transmit corresponding data via the signal connecting unit to the data transmission module of the passenger transport system.

2. The protection device of claim 1, wherein the fastening region of the at least one support is configured as a clamping region, wherein the clamping region is configured as a panel clamping region of a balustrade panel of the passenger transport system and is configured to be fastened in a clamping device fixedly installed on the supporting structure of the passenger transport system, and wherein the at least one sensor module is configured to detect whether or not the clamping region is fastened in the clamping device.

3. The protection device of claim 1, wherein the fastening region of the at least one support is configured as a clamp device for fastening to the supporting structure of the passenger transport system, wherein the clamp device has a clamping plate and at least one clamping claw which can be braced toward the clamping plate, wherein the at least one sensor module is positioned in the at least one clamping claw and/or in the clamping plate, and wherein the at least one sensor module is configured to detect whether or not a region of the supporting structure is fastened between the clamping plate and the at least one clamping claw.

4. The protection device of claim 1, wherein at least two of the at least one support are fixedly connected to at least one of the at least one blocking device and form a rigid railing.

5. The protection device of claim 1, wherein the at least one support comprises a receptacle, in which the at least one blocking device is positioned so as to protrude from the receptacle.

6. The protection device of claim 5, wherein one of the at least one sensor module is positioned in the receptacle, which sensor module is configured to detect receptacle data about an arrangement of the at least one blocking device in the receptacle and to transmit said receptacle data via the signal connecting unit to the data transmission module of the passenger transport system.

7. The protection device of claim 1, wherein the at least one support comprises a hinge positioned between the fastening region and the at least one blocking device so that the at least one support is configured to pivot between a transport position and an installation position, and wherein one of the at least one sensor module is positioned in a region of the hinge, which sensor module is configured to detect hinge data about a position state of the hinge and transmit said hinge data via the signal connecting unit to the data transmission module of the passenger transport system.

8. The protection device of claim 7, wherein one of the at least one blocking device connected to the at least one support is configured to block pivoting of the hinge at least in the installation position.

9. The protection device of claim 1, wherein the at least one sensor module comprises a passive or active RFID chip and at least one sensor element from the group: force measurement sensor, bipolar switch, proximity sensor, optical sensor.

10. The protection device according to claim 9, wherein the signal connecting unit has an RFID reader and a signal transmission module.

11. The protection device of claim 2, wherein at least two of the at least one support are fixedly connected to at least one of the at least one blocking device and form a rigid railing.

12. The protection device of claim 2, wherein the at least one support comprises a receptacle, in which the at least one blocking device is positioned so as to protrude from the receptacle.

13. The protection device of claim 5, wherein the at least one support comprises a hinge positioned between the fastening region and the at least one blocking device or the receptacle of the at least one support so that the at least one support is configured to pivot between a transport position and an installation position, and wherein one of the at least one sensor module is positioned in a region of the hinge, which sensor module is configured to detect hinge data about a position state of the hinge and transmit said hinge data via the signal connecting unit to the data transmission module of the passenger transport system.

14. The protection device of claim 2, wherein the at least one blocking device is configured such that personal protective equipment can be fastened thereto and at least one of the at least one sensor module is positioned in the at least one support such that the at least one sensor module is configured to detect a stress spike acting on the protection device and to transmit corresponding data via the signal connecting unit to the data transmission module of the passenger transport system.

15. An installation assembly comprising:

a passenger protection device comprising:

at least one blocking device; and at least one support which is connected to the at least one blocking device, wherein said at least one blocking device extends transversely to the at least one support and along a longitudinal extent of a passenger transport system at least during installation, wherein the at least one support comprises a fastening region at one end of the at least one support, which fastening region is configured for fastening to a supporting structure of the passenger transport system;

at least one sensor module; and a signal connecting unit configured to exchange data with the at least one sensor module and with a data transmission module of the passenger transport system, wherein the at least one sensor module is positioned in the fastening region of the at least one support, the at least one sensor module configured to detect the data about a fastening state of the fastening region and to transmit said data via the signal connecting unit to the data transmission module of the passenger transport system;

the passenger transport system;

a user interaction module; and an installation script, wherein the installation script is retrievable from a storage medium via a data connection to the data transmission module of the passenger transport system, and wherein the installation script is configured to be displayed on a screen of the user interaction module and to present, in chronological order, individual installation steps, which are acknowledged with a user input after a current individual installation step has been carried out, in order to call up a subsequent individual installation step; and wherein, in the case of at least one of the individual installation steps, the data from at least one of the at least one sensor module regarding the fastening state of the fastening region of the at least one support of the protection device corresponding to the at least one of the at least one sensor module is retrieved via the data transmission module and the signal connecting unit.

* * * * *